US011891009B1

(12) United States Patent
Smitterberg et al.

(10) Patent No.: US 11,891,009 B1
(45) Date of Patent: Feb. 6, 2024

(54) DEPLOYABLE PANEL ASSEMBLY DEPLOYED BY AIRBAG

(71) Applicant: Ford Global Technologies, LLC, Dearborn, MI (US)

(72) Inventors: Eric Axel Smitterberg, Berkley, MI (US); Russell Joseph Mihm, Beverly Hills, MI (US); Johnathan Andrew Line, Northville, MI (US); Chuck R. Reese, Northville, MI (US); James Robert Chascsa, II, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/051,989

(22) Filed: Nov. 2, 2022

(51) Int. Cl.
*B60R 21/216* (2011.01)
*B60R 21/205* (2011.01)
*B60R 21/2165* (2011.01)
*B60R 21/215* (2011.01)
*B60R 21/2338* (2011.01)

(52) U.S. Cl.
CPC .......... *B60R 21/216* (2013.01); *B60R 21/205* (2013.01); *B60R 21/2165* (2013.01); *B60R 2021/21506* (2013.01); *B60R 2021/21537* (2013.01); *B60R 2021/23386* (2013.01)

(58) Field of Classification Search
CPC . B60R 21/216; B60R 21/205; B60R 21/2165; B60R 2021/21537
See application file for complete search history.

(56) References Cited

U.S. PATENT DOCUMENTS

| 5,588,674 A | 12/1996 | Yoshimura et al. |
| 6,364,351 B1 | 4/2002 | Hier et al. |
| 6,435,554 B1 | 8/2002 | Feldman |

(Continued)

FOREIGN PATENT DOCUMENTS

| CN | 1449952 A | 10/2003 |
| DE | 10163686 A1 | 7/2003 |

(Continued)

OTHER PUBLICATIONS

Ex-Parte Quayle Office Action for U.S. Appl. No. 18/067,132, filed Dec. 16, 2022, as issued by the USPTO dated Aug. 17, 2023.

(Continued)

*Primary Examiner* — Drew J Brown
*Assistant Examiner* — Tiffany L Webb
(74) *Attorney, Agent, or Firm* — Frank A. MacKenzie; Bejin Bieneman PLC

(57) ABSTRACT

An assembly includes a dash and a deployable panel. The deployable panel has a proximal end rotatably connected to the dash. The deployable panel is rotatable about the proximal end from an undeployed position to a deployed position. The proximal end is engaged with the dash in the deployed position and the deployable panel has a distal end spaced above the dash in the deployed position. An airbag is supported by the dash and is inflatable to an inflated position. The airbag has a back panel abutting the deployable panel in the inflated position and an impact panel opposite the back panel. A tether is connected to the deployable panel and the impact panel. The tether extends through the back panel from the deployable panel to the impact panel.

18 Claims, 15 Drawing Sheets

(56) References Cited

U.S. PATENT DOCUMENTS

| | | |
|---|---|---|
| 6,616,182 B2 | 9/2003 | Woolley et al. |
| 6,688,640 B1 | 2/2004 | Davis, Jr. et al. |
| 7,354,060 B2 | 4/2008 | Thomas |
| 7,540,531 B2 | 6/2009 | Sakakibara et al. |
| 7,594,674 B1 | 9/2009 | Biondo et al. |
| 7,874,578 B2 | 1/2011 | Thomas et al. |
| 8,376,395 B2 * | 2/2013 | Ory .................. B60R 21/215 280/743.2 |
| 8,408,588 B2 * | 4/2013 | Wittkamp ........... B60R 21/2165 280/728.3 |
| 8,657,328 B2 * | 2/2014 | Ory .................. B60R 21/205 280/743.2 |
| 8,888,125 B2 * | 11/2014 | Ory .................. B60R 21/216 280/743.2 |
| 9,415,741 B2 | 8/2016 | Yokota et al. |
| 10,077,020 B2 | 9/2018 | Raikar et al. |
| 10,457,241 B2 | 10/2019 | Weerappuli |
| 10,864,876 B2 | 12/2020 | Malapati et al. |
| 10,946,825 B2 | 3/2021 | Ghannam et al. |
| 11,052,855 B2 | 7/2021 | Malapati et al. |
| 11,059,445 B2 | 7/2021 | Malapati et al. |
| 11,167,716 B2 | 11/2021 | Tay et al. |
| 11,247,632 B2 * | 2/2022 | Malapati ............ B60R 21/205 |
| 11,299,122 B2 | 4/2022 | Choi |
| 11,447,089 B2 * | 9/2022 | Deutschmann ..... B60R 21/2155 |
| 11,643,041 B2 * | 5/2023 | Suzuki ................ B60R 21/205 280/728.1 |
| 2004/0174003 A1 | 9/2004 | Dominissini |
| 2011/0285115 A1 | 11/2011 | Putala et al. |
| 2014/0265269 A1 | 9/2014 | Fischer et al. |
| 2022/0144202 A1 | 5/2022 | Morita et al. |
| 2023/0132711 A1 * | 5/2023 | Nakanishi ............ B60R 21/216 280/728.3 |

FOREIGN PATENT DOCUMENTS

| | | |
|---|---|---|
| DE | 10023651 B4 | 8/2008 |
| DE | 10325932 B4 | 4/2019 |
| KR | 20010059088 A | 7/2001 |

OTHER PUBLICATIONS

Non-Final Office Action dated Oct. 5, 2023 re U.S. Appl. No. 18/051,947, filed Nov. 2, 2022.

* cited by examiner

DEPLOYABLE PANEL ASSEMBLY DEPLOYED BY AIRBAG

BACKGROUND

A vehicle may include one or more airbags inflatable during certain vehicle impacts to control kinematics of occupants inside the vehicle. The airbag may be a component of an airbag assembly including a housing supporting the airbag. The airbag assembly includes an inflation device in communication with the airbag for inflating the airbag from an uninflated position to an inflated position. The airbag inflatable by the inflation device is positioned to abut the windshield or side windows when in the inflated position.

DETAILED DESCRIPTION

Figure 1:
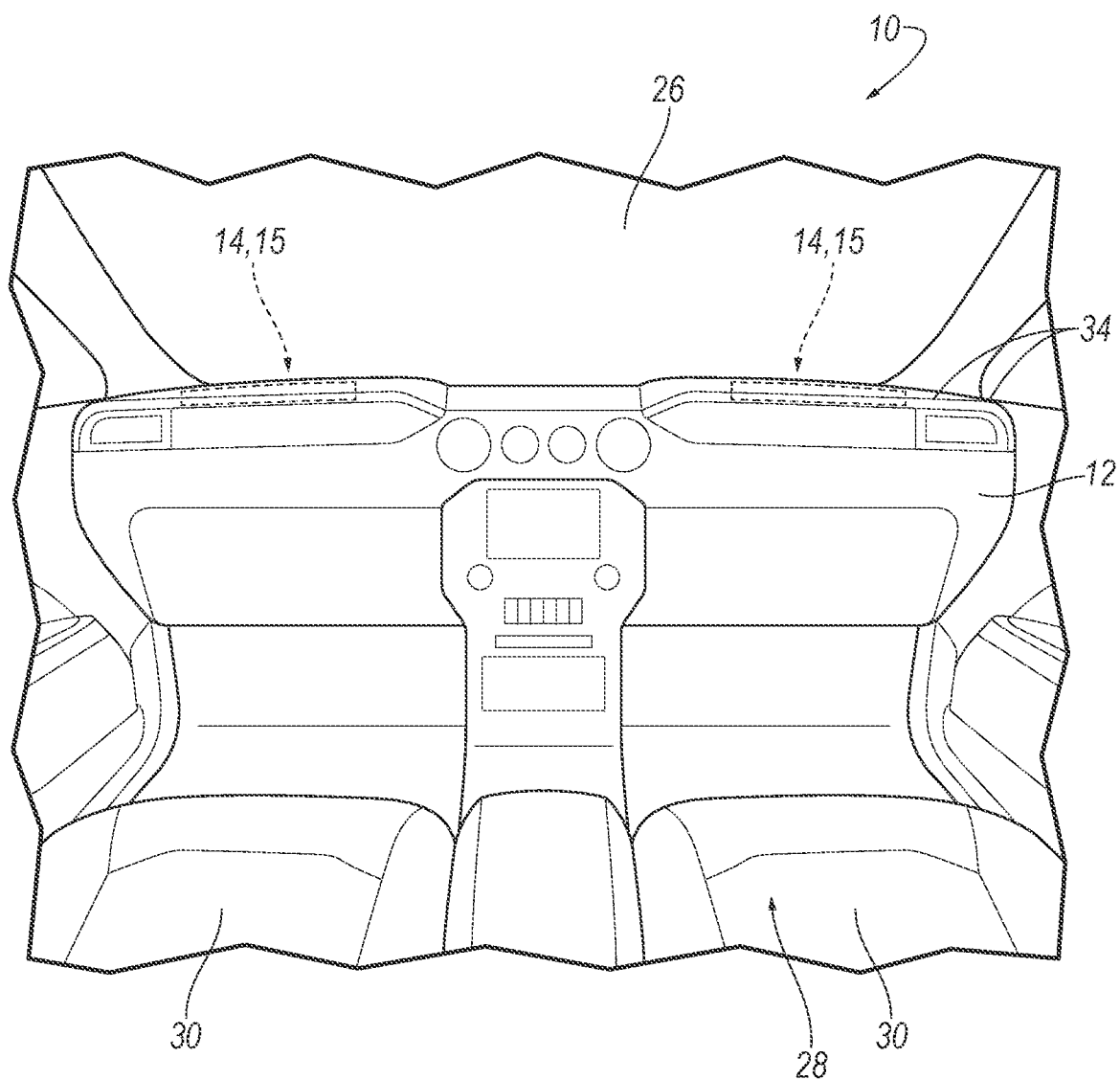
FIG. 1 is a perspective view of an interior of a vehicle with two deployable panel assemblies each in an undeployed position.
Figure 2:
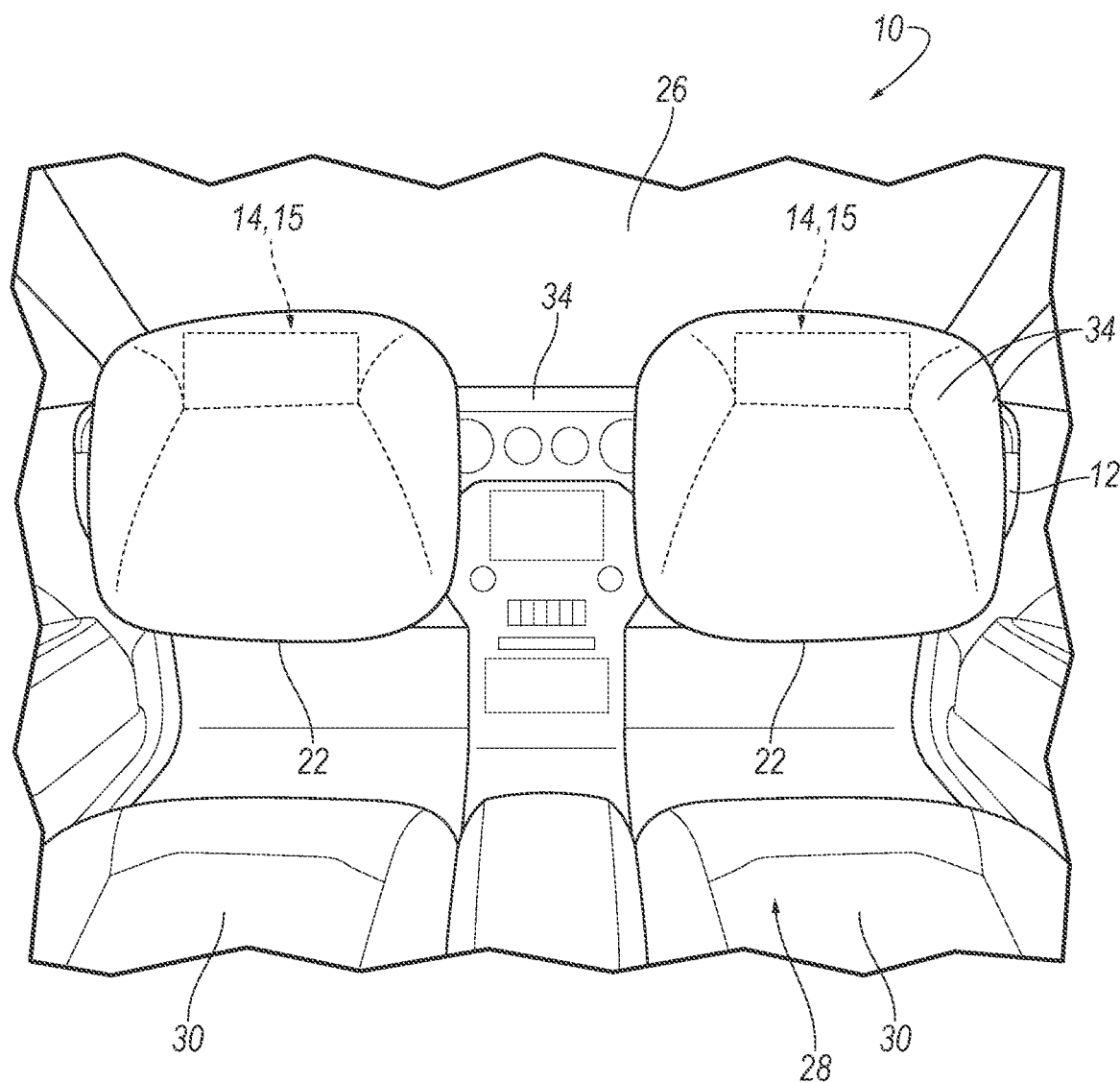
FIG. 2 is a perspective view of an interior of a vehicle with the two deployable panel assemblies each in a deployed position.
Figure 3:
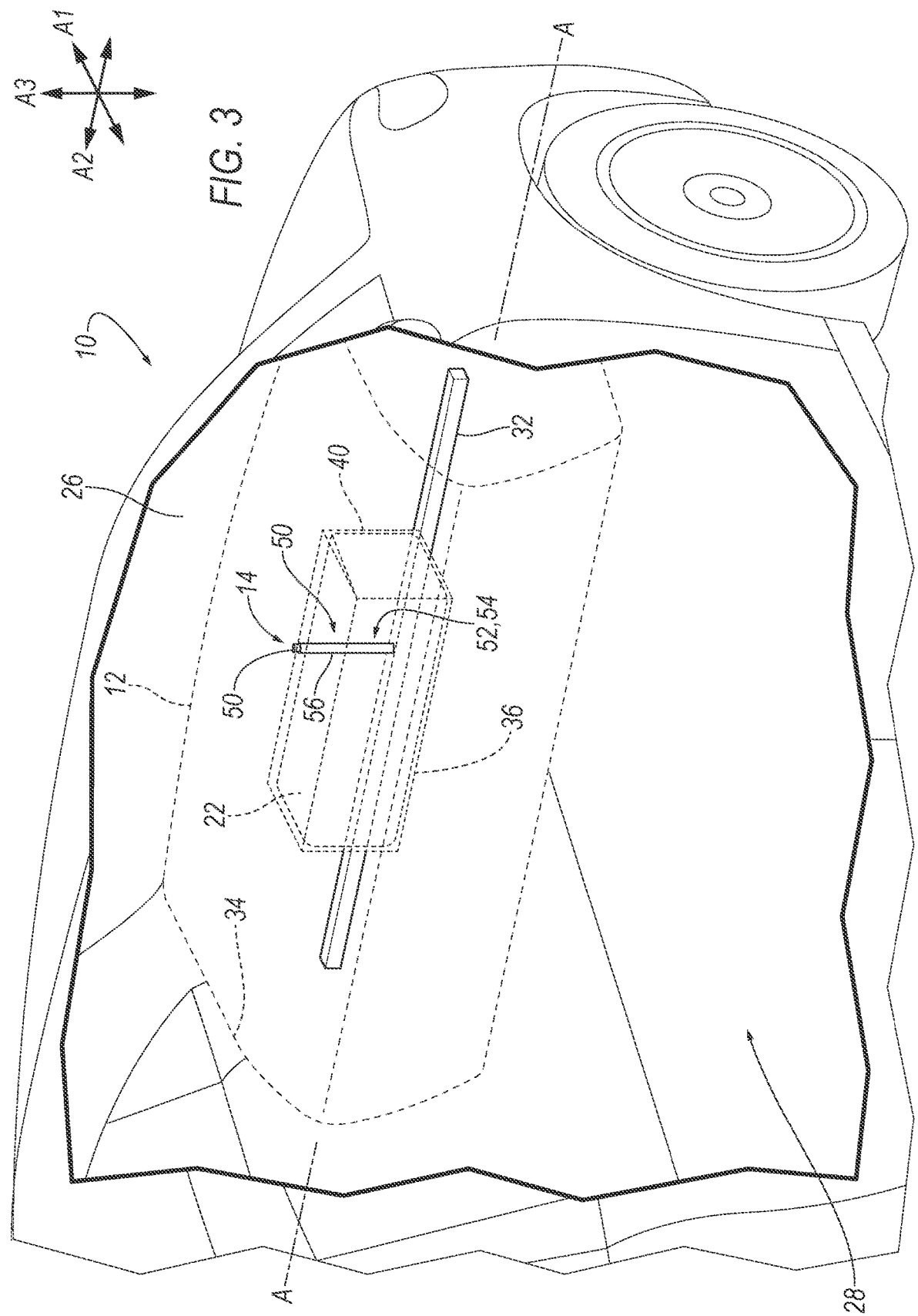
FIG. 3 is a perspective view an example of the deployable panel assembly in the undeployed position.
Figure 4:
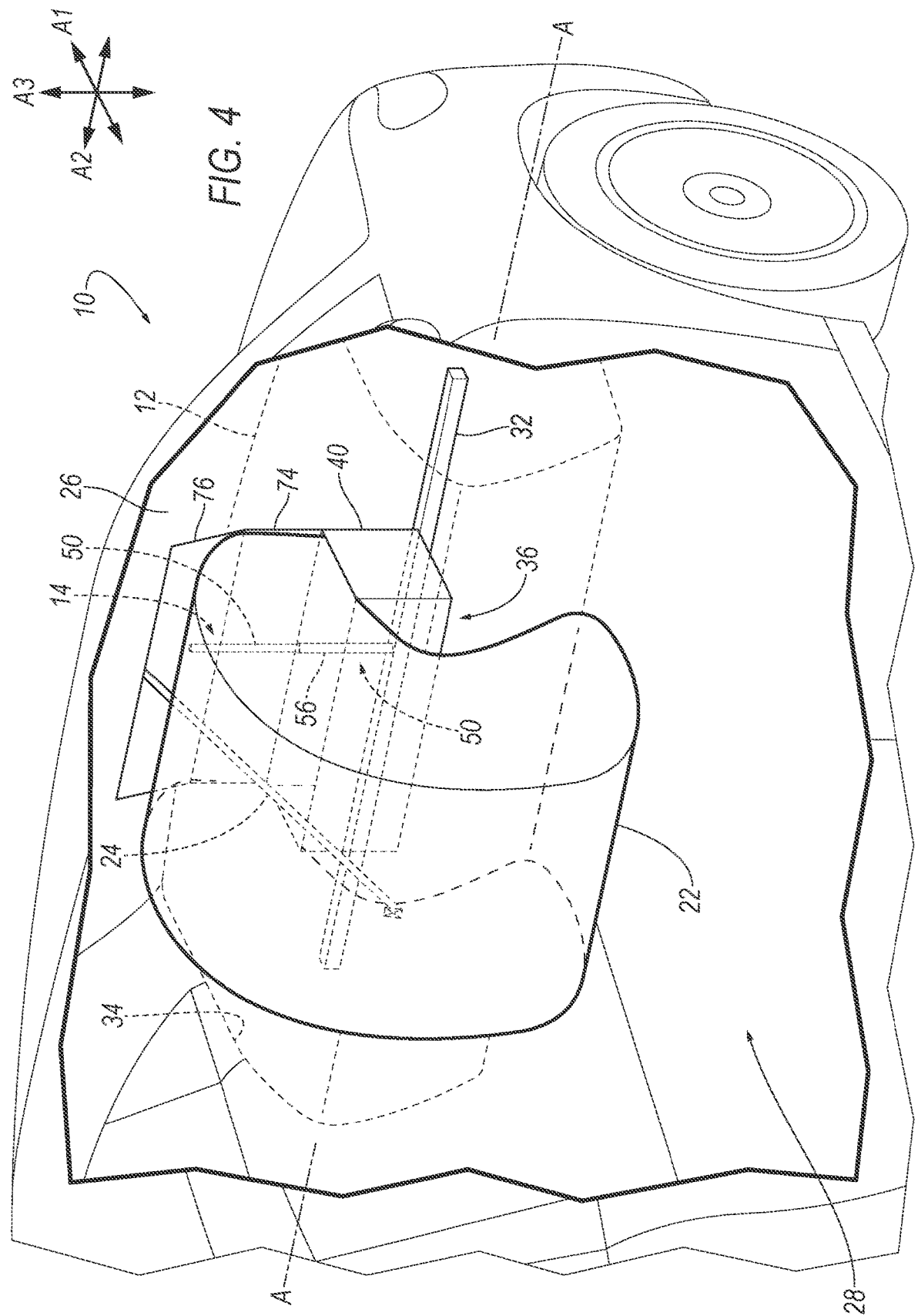
FIG. 4 is a perspective view of the example of FIG. 3 with the deployable panel assembly in the deployed position.
Figure 5:
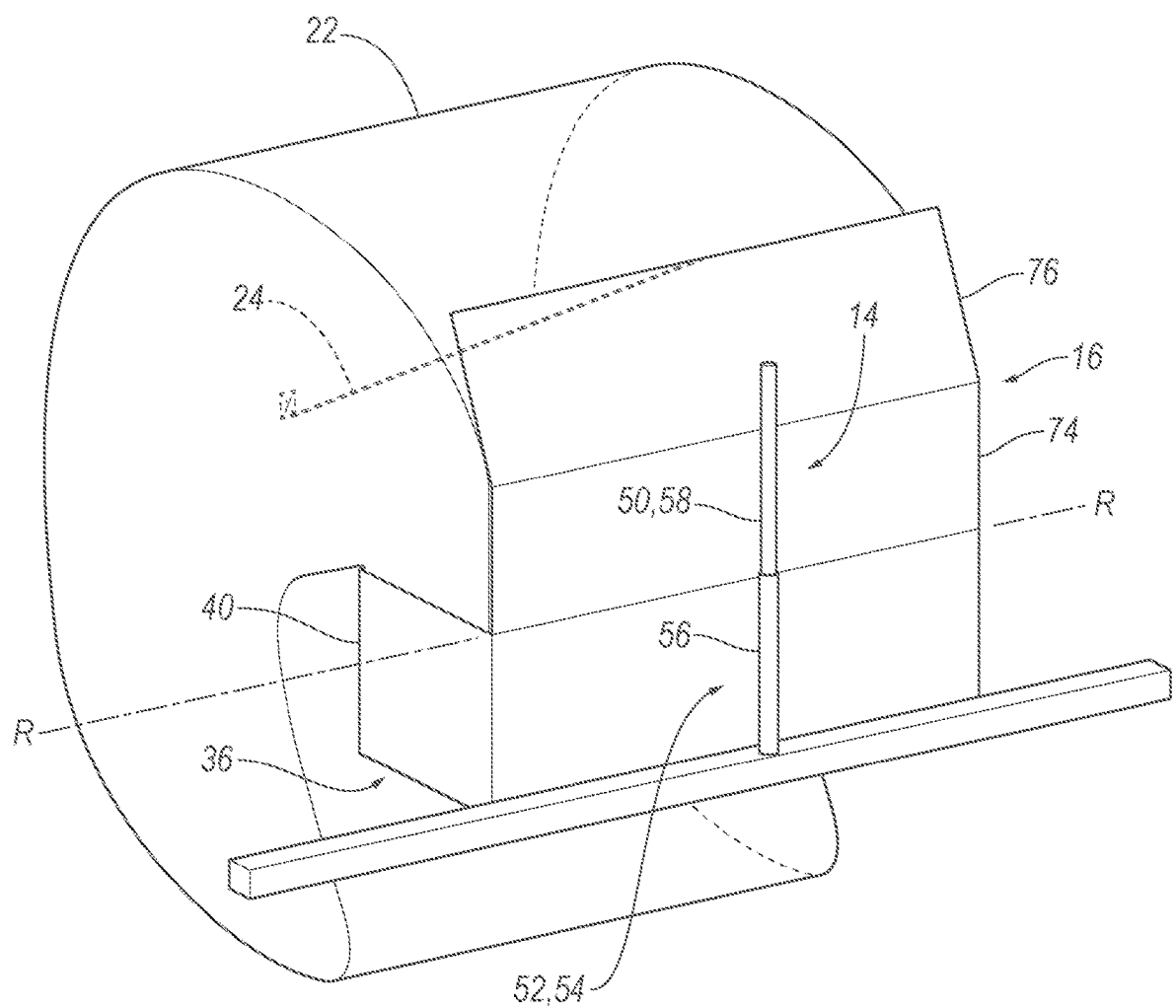
FIG. 5 is a perspective view of the deployable panel assembly of FIG. 3.
Figure 6:
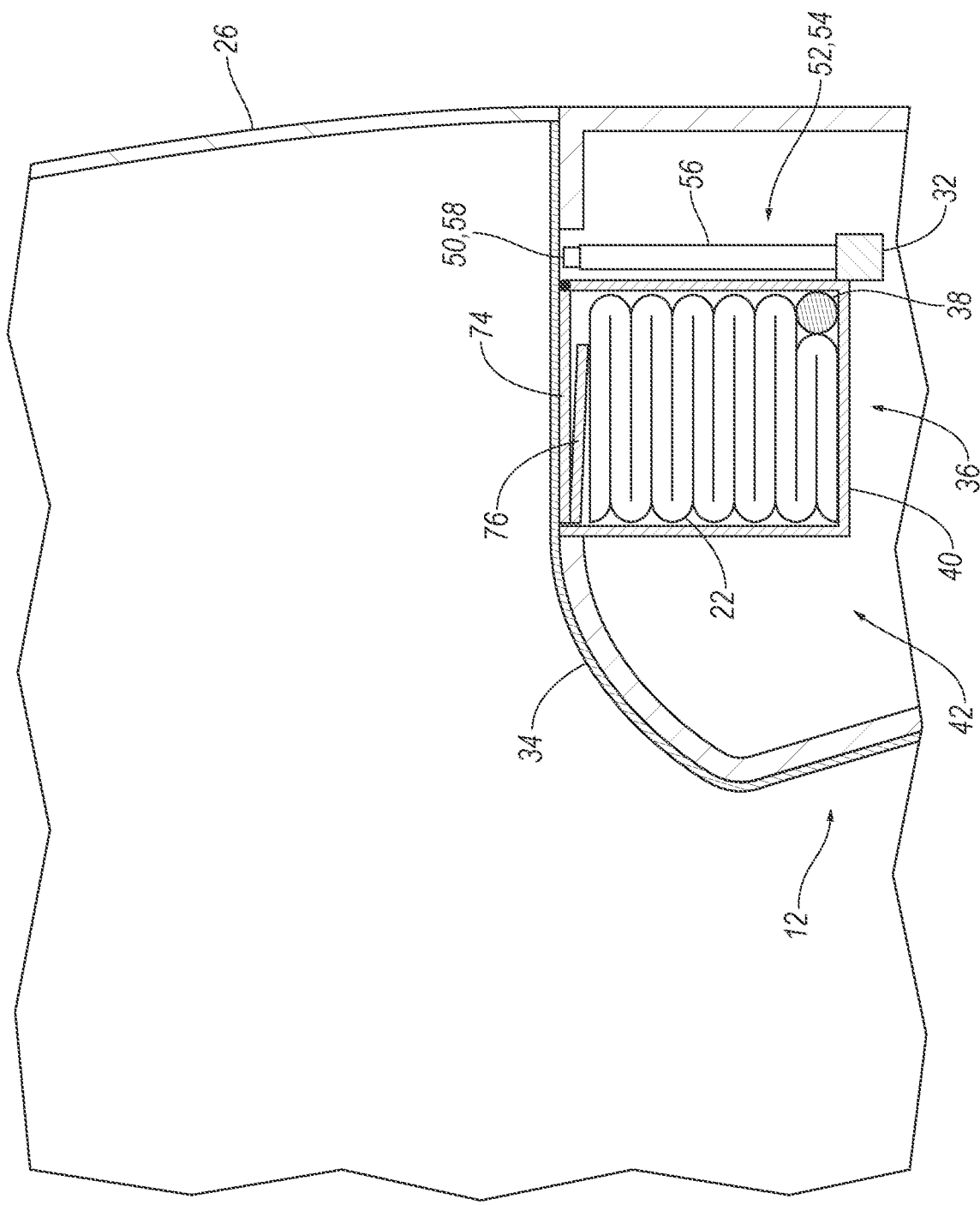
FIG. 6 is a cross-sectional view of a dash and the deployable panel assembly of FIG. 3 in the undeployed position.
Figure 7:
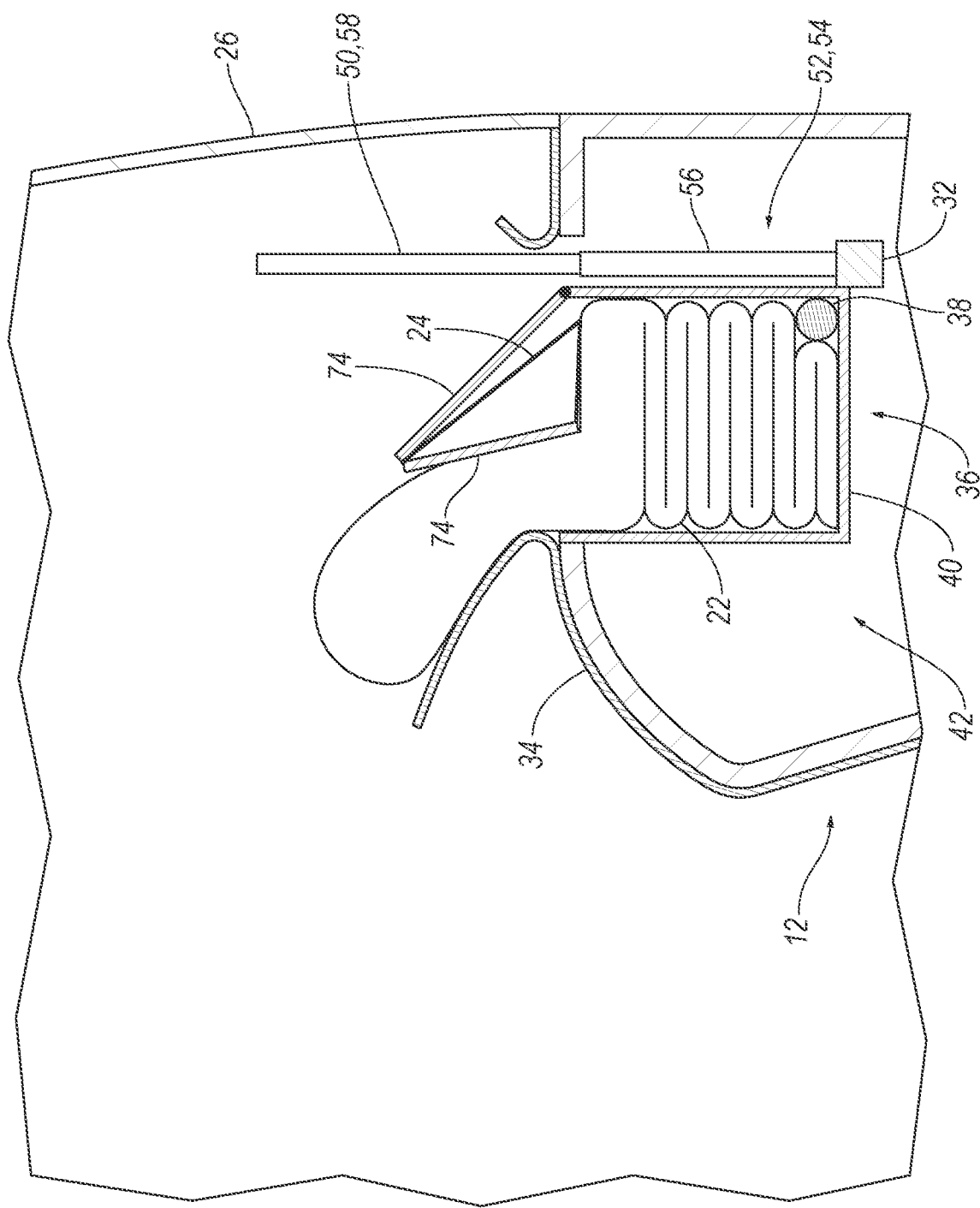
FIG. 7 is the cross-sectional view of FIG. 6 with an airbag partially inflated.
Figure 8:
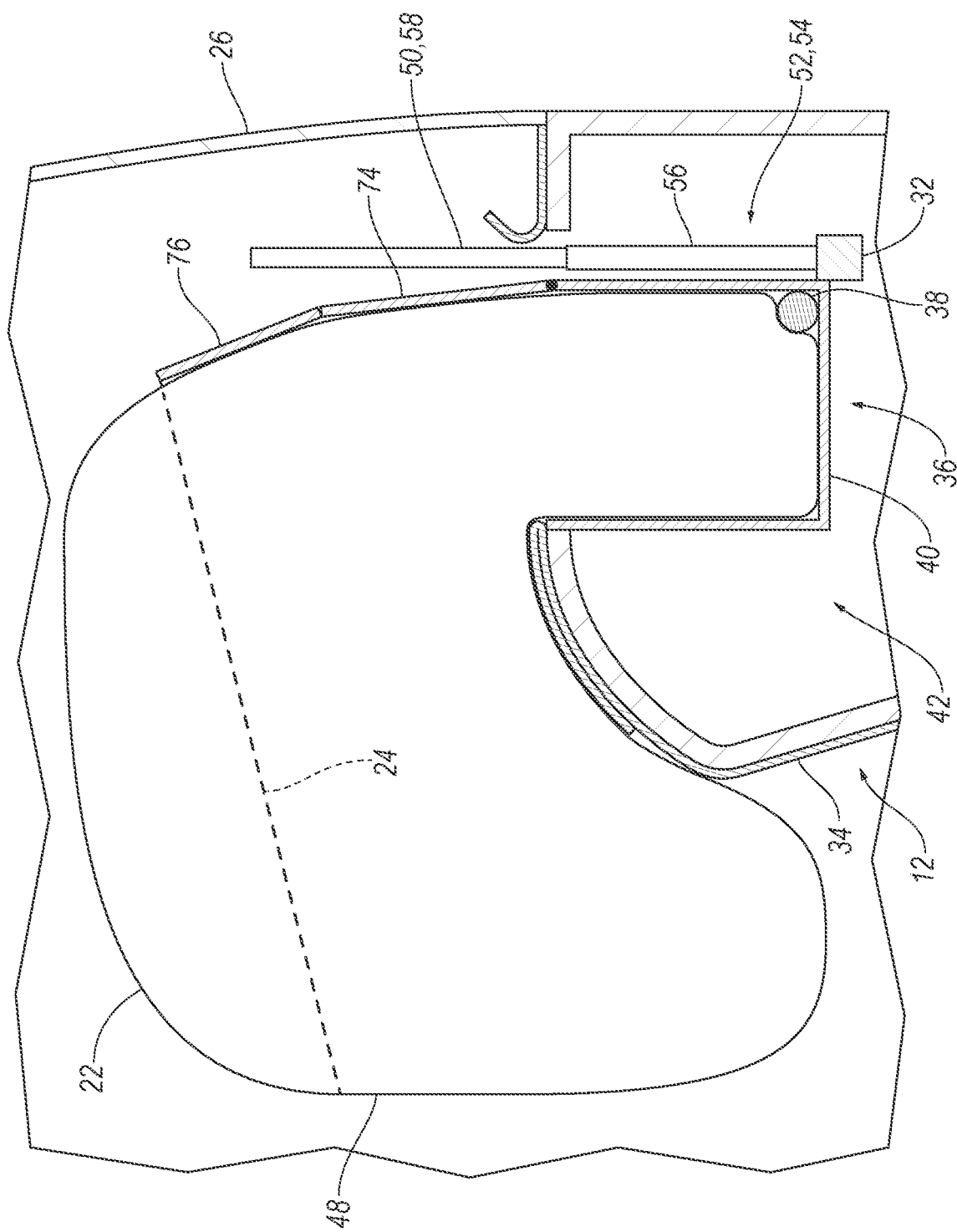
FIG. 8 is the cross-sectional view of FIG. 7 with the airbag in an inflated position.

An assembly includes a dash and a deployable panel having a proximal end rotatably connected to the dash. The deployable panel is rotatable about the proximal end from an undeployed position to a deployed position. The proximal end is engaged with the dash in the deployed position and the deployable panel has a distal end spaced above the dash in the deployed position. An airbag is supported by the dash and is inflatable to an inflated position. The airbag has a back panel abutting the deployable panel in the inflated position and an impact panel opposite the back panel. A tether is connected to the deployable panel and the impact panel and extends through the back panel from the deployable panel to the impact panel.

The airbag may define an inflation chamber defined between the back panel and the impact panel, the tether extending through the inflation chamber from the back panel to the impact panel.

The tether may be flexible relative to the deployable panel.

The tether may be fabric.

The deployable panel in the deployed position may be rigid relative to the airbag in the inflated position.

The proximal end of the deployable panel may be rotatable about a rotational axis and the deployable panel may be elongated along the rotational axis.

The dash may be elongated along a longitudinal axis and the proximal end of the deployable panel may be rotatable about a rotational axis generally parallel with the longitudinal axis.

The assembly may include an airbag housing connected to the dash, the deployable panel being rotatably connected to the housing below a covering of the dash in the undeployed position. The upper deployable panel of the dash may include a tear seam.

The assembly may include a windshield, the deployable panel being between the airbag and the windshield.

The deployable panel may have a proximal segment having the proximal end and a distal segment having the distal end, the distal segment being folded against the proximal segment in the undeployed position. The distal segment may be designed to unfold from the proximal end from the undeployed position to the deployed position.

The assembly may include a member supported by the dash and translatable upwardly from an undeployed position to a deployed position, the deployable panel abutting the member in the deployed position, the member being rigid relative to the deployable panel in the deployed position The assembly may include a deployable leg extending from the deployable panel in the deployed position and abutting the dash. The deployable panel may be between the airbag and the leg. The deployable leg may include a lower segment extending from the proximal end of the deployable panel along the dash and an upper segment extending from the distal end of the deployable panel downwardly to the lower segment. The deployable panel may be between the airbag and the deployable leg. The lower segment may include a fold when the deployable panel is in the undeployed position.

With reference to the Figures, wherein like numerals indicate like parts throughout the several views, an assembly includes a dash 12 and a deployable panel 16, 17. The deployable panel 16, 17 has a proximal end 18 rotatably connected to the dash 12. The deployable panel 16, 17 is rotatable about the proximal end 18 from an undeployed position to a deployed position. The proximal end 18 is engaged with the dash 12 in the deployed position and the deployable panel 16, 17 has a distal end 20 spaced above the dash 12 in the deployed position. An airbag 22 is supported by the dash 12 and is inflatable to an inflated position. The airbag 22 has a back panel 46 abutting the deployable panel 16, 17 in the inflated position and an impact panel 48 opposite the back panel 46. A tether 24 is connected to the deployable panel 16, 17 and the impact panel 48. The tether 24 extends through the back panel 46 from the deployable panel 16, 17 to the impact panel 48.

The deployable panel 16, 17 is in the undeployed position prior to inflation of the airbag 22 to the inflated position, i.e., when the airbag 22 is in an uninflated position. Since the tether 24 extends from the airbag 22 to the deployable panel 16, 17, the airbag 22 moves the deployable panel 16, 17 from the undeployed position toward the deployed position as the airbag 22 inflates from the uninflated position to the inflated position. In the deployed position, the deployable panel 16, 17 guides the direction of inflation of the airbag 22 and acts as a reaction surface for the airbag 22 in the inflated position. This allows for the airbag 22 to be positioned vehicle-rearward of a windshield 26 of the vehicle 10 in a position that does not use the windshield 26 as a reaction surface for the airbag 22. In such an example, this reduces design constraints on the vehicle-forward position of the windshield 26 and/or upward angle of the windshield 26. Since the tether 24 is connected to the impact panel 48, the impact panel 48 pulls the deployable panel 16, 17 to the deployed position. During inflation of the airbag 22, the impact panel 48 may experience high inflation forces that are transferred to the deployable panel 16, 17 by the tether 24 during inflation of the airbag 22.

The vehicle 10 may be any type of passenger or commercial automobile, such as a car, a truck, a sport utility vehicle, a crossover vehicle, a van, a minivan, a taxi, a bus, etc. The vehicle 10 defines a vehicle-longitudinal axis A1, e.g., extending between a front and a rear of the vehicle. The vehicle 10 defines a cross-vehicle axis A2, e.g., extending between a left side and a right side of the vehicle. The vehicle 10 defines a vehicle-vertical axis A3, e.g., extending between a top and a bottom of the vehicle. The vehicle-longitudinal axis A1, the cross-vehicle axis A2, and the vehicle-vertical axis A3 are perpendicular to each other. The top, bottom, front, rear, left and right sides, and relative directions used herein (such as vehicle-forward, vehicle-rearward, upward, downward, etc.) may be relative to an orientation of an occupant of the vehicle. The top, bottom, front, rear, left and right sides, and relative directions used herein may be relative to an orientation of controls for operating the vehicle 10 and a driving direction of the vehicle 10 when wheels of the vehicle 10 are straight and the vehicle 10 is powered.

The vehicle 10 includes a passenger cabin 28. The passenger cabin 28 includes one or more seats 30. The seats 30 are shown as bucket seats and in other examples the seats 30 may be other types, such as bench seats. The seats 30 may face the dash 12. In other words, a seat 30 bottom of the seat 30 may extend from a seatback of the seat 30 toward the dash 12.

The dash 12 may be disposed at a forward end of the passenger cabin 28 and may face toward the seats 30. The dash 12 is located inside of the passenger cabin 28. The dash 12 may be elongated along the cross-vehicle axis A2. The dash 12 may extend from one side of the vehicle 10 to the other side of the vehicle, i.e., across the passenger compartment in a cross-vehicle direction. For example, the dash 12 may extend from one hinge pillar to another hinge pillar.

In some examples, the dash 12 may be an instrument panel that includes one or more instruments, such as gauges, displays, etc. The dash 12 may include vehicle controls, such as a steering wheel, a touch screen interface, button, nobs, switches, heating and ventilation equipment; a radio and other electronics; etc. The dash 12, as well as the rest of the vehicle 10, may lack a steering wheel and may lack pedals for accelerating and braking. In other words, as shown in the Figures, no steering wheel or pedals for accelerating and braking are supported by or adjacent to the dash 12. More specifically, the vehicle 10 does not include a steering wheel or pedals for accelerating and braking, e.g., the vehicle 10 is autonomous. The dash 12 may, for example, be flat in the cross-vehicle direction. In other words, the dash 12 may be generally planar. In some examples, the dash 12 may also be called a bulkhead or an instrument panel.

The dash 12 may include a frame 32 and a covering 34 supported on the frame 32. The frame 32 of the dash 12 is connected to a body of the vehicle, e.g., with fasteners, brackets, etc. The frame 32 of the dash 12 may be metal, rigid polymer, a composite, or a combination of rigid materials. The frame 32 structurally supports the covering 34 and other components of the dash 12 on the body of the vehicle 10.

The dash 12 may be a structural member of the body of the vehicle, i.e., the frame 32 resists static and dynamic forces from operation of the vehicle 10 without undue deflection or distortion. Examples of forces include a weight of other vehicle 10 components, passengers, and cargo; twisting forces caused by driving over uneven surfaces; torque from a transmission; longitudinal and lateral forces from driving; and possibly forces from certain impacts with other vehicles or impactors.

The covering 34 of the dash 12 may conceal the frame 32. The covering 34 is exposed to the passenger cabin 28. Specifically, the covering 34 may have a class-A surface, i.e., a surface specifically manufactured to have a high quality, finished aesthetic appearance free from blemishes. The covering 34 may be vinyl, cloth, leather, faux leather, plastic (such as acrylonitrile butadiene styrene (ABS)), etc., and combinations thereof. The covering 34 may include a substrate and upholstery supported on the substrate, as shown in the examples shown in the Figures.

The windshield 26 extends upwardly from the dash 12. Specifically, the windshield 26 may extend from the dash 12 to a roof of the vehicle. The windshield 26 is transparent. The windshield 26 may be at the forward end of the passenger cabin 28. The windshield 26 may include a bottom edge and a top edge. The bottom edge may be vehicle-forward forward of the top edge. In other words, the top edge may be between the bottom edge and the seats 30 relative to the vehicle-longitudinal axis A1. In another example, the windshield 26 may be generally vertical. For example, the top edge may be generally vertical of the bottom edge relative to the vehicle-vertical axis A3.

The assembly includes an airbag 22 assembly. The airbag 22 assembly includes the airbag 22 and an inflator 38 and may include a housing. The airbag 22 assembly may be positioned to be a passenger airbag 22 assembly. In the example shown in the Figures, the vehicle 10 may be an autonomous vehicle without a steering wheel, and in such an example, the vehicle 10 may include two deployable panel assemblies 14, 15, i.e., one in front of the left front seat and another in front of the right front seat. In an example in which the vehicle 10 includes a steering wheel, the vehicle 10 may have one deployable panel assembly 14, 15 in front of the passenger seat 30, e.g., the right front seat. Alternatively, the vehicle 10 may have any suitable number of deployable panel assemblies 14, 15 in any suitable position.

The airbag 22 is mounted to the dash 12, e.g., via the airbag housing 40. Specifically, the airbag 22 assembly may be supported by the frame 32, i.e., the weight of the airbag 22 assembly may be borne by the frame 32, and the airbag housing 40 may be mounted to the frame 32 of the dash 12, e.g., with threaded fasteners, brackets, etc. The airbag housing 40 houses the airbag 22 in an uninflated position and supports the airbag 22 in the inflated position. The airbag 22 may be rolled and/or folded to fit within the airbag housing 40 in the uninflated position. The airbag housing 40 may be of any suitable material, e.g., a rigid polymer, a metal, a composite, or a combination of rigid materials. The airbag housing 40 may be supported by the dash 12.

The airbag 22 has a back panel 46 and an impact panel 48 opposite the back panel 46. Specifically, the airbag 22 defines an inflation chamber and the back panel 46 and the impact panel 48 oppose each other about the inflation chamber. The impact panel 48 is vehicle-forward of the back panel 46. The back panel 46 of the airbag 22 abuts the deployable panel 16, 17 in the inflated position. The impact panel 48 is positioned to be impacted by an occupant to control the kinematics of the occupant.

The airbag 22 may be a woven polymer or any other material. As one example, the airbag 22 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 38 is in fluid communication with the airbag 22, e.g., via tubing or other structure to transfer inflation medium from the inflator 38 to the airbag 22. Upon receiving an instruction, such as an electrical pulse, from, e.g., a controller, the inflator 38 may inflate the airbag 22 with an inflatable medium, such as a gas, to the inflated position. The inflator 38 may be, for example, a pyrotechnic inflator 38 that uses a chemical reaction to drive inflation medium to the airbag 22. The inflator 38 may be of any suitable type, for example, a cold-gas inflator 38. The inflator 38 may be supported by the housing or at any other suitable vehicle location. Inflation of the airbag 22 may tear, separate, or otherwise deform the dash 12.

The assembly includes a deployable panel assembly 14, 15 including the deployable panel 16, 17 and the tether 24 extending from the deployable panel 16, 17 to the airbag 22. One example of a deployable panel assembly 14 including the deployable panel 16 is shown in FIGS. 2-8 in which the deployable panel assembly 14 includes a member 50 deployable vehicle-forward of the deployable panel 16, 17, e.g., with the use of an actuator 52 such as a pyrotechnic linear actuator 54. Another example of the deployable panel assembly 15 is shown in FIGS. 10-15 in which the deployable panel assembly 15 includes a deployable leg 66 that deploys vehicle-forward of the deployable panel 16, 17 and abuts the covering 34 of the dash 12.

The deployable panel assembly 14, 15, including the deployable panel 16, 17, is below the covering 34 of the dash 12 when the deployable panel 16, 17 is in the undeployed position. The covering 34 conceals the deployable panel assembly 14, 15, including the deployable panel 16, 17, when the deployable panel 16, 17 is in the undeployed position. The airbag 22 is below the covering 34 and concealed by the covering 34 in the uninflated position. The airbag 22 is inflatable upwardly from the uninflated position to the inflated position. Since the airbag 22 is below the covering 34, as the airbag 22 inflates upwardly, the airbag 22 moves the deployable panel 16, 17 to the deployed position.

Specifically, the deployable panel 16, 17 is rotatable about the proximal end 18 from an undeployed position to a deployed position under the force of the airbag 22 as the airbag 22 inflates toward the inflated position. The proximal end 18 is engaged with the dash 12 in the deployed position and the airbag 22 rotates the distal end 20 about the proximal end 18 to the deployed position. Specifically, the airbag 22 rotates the distal end 20 upwardly relative to the proximal end 18 and the distal end 20 is spaced above the dash 12 in the deployed position.

The proximal end 18 is rotatably coupled to the dash 12. As an example, as shown in the example in the Figures, proximal end 18 may be rotatably connected to the airbag housing 40, i.e., indirectly connected to the dash 12 through the airbag 22 assembly. As another example, the proximal end 18 may be rotatably connected to the covering 34 of dash 12, as described further below. The proximal end 18 is rotatably connected to the airbag housing 40 or the covering 34 of the dash 12 at a hinge. The hinge may be, for example, a living hinge. The proximal end 18 remains connected relative to the dash 12 when the deployable panel 16, 17 is in the deployed position. In other words, the hinge remains intact connecting the proximal end 18 of the deployable panel 16, 17 to the airbag housing 40 or the covering 34.

The dash 12, for example, defines a cavity 42. The deployable panel assembly 14, 15 and the airbag 22 assembly may be positioned in the cavity 42 when the deployable panel 16, 17 is in the undeployed position and the airbag 22 is in the uninflated position. The deployable panel 16, 17 is extended from the cavity 42 to the deployed position and the airbag 22 is extended from the cavity 42 in the inflated position.

In the example shown in the Figures, the deployable panel 16, 17 and the airbag 22 are below the covering 34 of the dash 12 when the deployable panel 16, 17 is in the undeployed position, e.g., in the cavity 42 below the covering 34. In such an example, inflation of the airbag 22 breaks the covering 34, as shown in the Figures. As another example, for example as a variation of the example shown in FIGS. 3-9, the deployable panel 16 may be flush with the covering 34 of the dash 12 and may connected to the covering 34 around a perimeter of the cavity 42 and the deployable panel 16. In such an example, the deployable panel 16 may have a class-A surface that matches the class-A surface of the covering 34, e.g., the texture, color, etc. In another example, for example as a variation of the example shown in FIGS. 10-15, the deployable leg 66 may be flush with the covering 34 of the dash 12 and may be connected to the covering 34 around perimeter of the cavity 42 and the deployable panel 16, 17.

The dash 12, and specifically the covering 34 of the dash 12, may include a tear seam breakable by the airbag 22 as the airbag 22 inflates to the inflated position. The tear seam is designed to separate upon inflation of the airbag 22. In the examples shown in the Figures, the tear seam is in the covering 34 such that two segments of the covering 34 connected by the tear seam separate upon inflation of the airbag 22. In examples in which the deployable panel 16, 17 is flush with the covering 34, the tear seam may be between the covering 34 and the deployable panel 16, 17. The tear seam may be weaker than a portion of the covering 34 adjacent the tear seam, e.g., the tear seam may include a perforated line, may be thinner, may be a weaker material, etc. The tear seam is positioned to be separated by the airbag 22 during inflation of the airbag 22. Specifically, the tear seam may be adjacent the airbag 22 when the airbag 22 is in the uninflated position.

As set forth above, the deployable panel 16, 17 is rotatable relative to the dash 12 between the undeployed position and the deployed position. Specifically, the proximal end 18 of the panel is rotatable about a rotational axis R. The deployable panel 16, 17 may be elongated along the rotational axis R. The rotational axis R may be generally parallel with the longitudinal axis of the dash 12.

The deployable panel 16, 17 in the deployed position is between the windshield 26 and the airbag 22 in the inflated position. The deployable panel 16, 17 has a reaction surface 44 that faces generally vehicle-rearward toward the airbag 22 in the inflated position. The airbag 22 abuts the reaction surface 44 when the deployable panel 16, 17 is in the deployed position and the airbag 22 is in the inflated position.

The deployable panel 16, 17 is adjacent the airbag 22. In other words, the deployable panel 16, 17 is positioned such that, when the deployable panel 16, 17 is in the deployed position and the airbag 22 is inflated, the airbag 22 impacts the deployable panel 16, 17 and the deployable panel 16, 17 directs the movement of the airbag 22 during inflation. For example, the reaction surface 44 may be positioned to abut the airbag 22 in the inflated position when the deployable panel 16, 17 is in the deployed position, limiting movement of the airbag 22 toward the windshield 26 and positioning the airbag 22 relative to the dash 12, the seat 30, etc.

The deployable panel 16, 17 is sized and shaped to position to operate as a reaction surface 44 for the airbag 22 to position the airbag 22 relative to the dash 12 in the inflated position. The deployable panel 16, 17 may be in a plane along the cross-vehicle axis. For example, the deployable panel 16, 17 may be elongated along the cross-vehicle axis A2.

The deployable panel 16, 17 is rigid relative to the airbag 22. In other words, the deployable panel 16, 17 does not deform or deforms less than the airbag 22 when the airbag 22 is in the inflated position and the deployable panel 16, 17 is in the deployed position. Specifically, the deployable panel 16, 17 guides the inflation of the airbag 22 and the shape and position of the airbag 22 is defined by the deployable panel 16, 17, and specifically the back panel 46 of the deployable panel 16, 17. Reaction forces between the airbag 22 and the back panel 46 urge the airbag 22 to inflate and/or move transverse to the back surface. The back panel 46 in the deployed position may be between the windshield 26 and the seat 30, e.g., positioning the airbag 22 in the inflated position closer to the seat 30 than if the windshield 26 functioned as a reaction surface 44 for the airbag 22. The deployable panel 16, 17 may be, for example, plastic, metal, or any other suitable material.

The tether 24 extends from the airbag 22 to the deployable panel 16, 17 in the undeployed position and in the deployed position. Since the tether 24 extends from the airbag 22 to the deployable panel 16, 17, the airbag 22 moves the deployable panel 16, 17 from the undeployed position to the deployed position as the airbag 22 inflates from the uninflated position to the inflated position. The tether 24 remains connected to the deployable panel 16, 17 and the airbag 22 when the deployable panel 16, 17 reaches the deployed position.

The tether 24 is positioned to transmit upward force from the airbag 22 to the deployable panel 16, 17 to raise the deployable panel 16, 17 to the deployed position as the airbag 22 inflates to the inflated position. The tether 24 is connected to the impact panel 48 such that the impact panel 48 exerts an upward force from the airbag 22 to the deployable panel 16, 17 after the airbag 22 has extended from the cavity 42 and continues to inflate to the inflated position. During inflation of the airbag 22, the impact panel 48 may experience high inflation forces that are transferred to the deployable panel 16, 17 by the tether 24 during inflation of the airbag 22. Specifically, during inflation of the airbag 22, the impact panel 48 may receive the highest inflation forces relative to other portions of the airbag 22.

The tether 24 extends through the back panel 46 of the airbag 22 from the deployable panel 16, 17 to the impact panel 48. Specifically, the tether 24 extends through the inflation chamber from the back panel 46 to the impact panel 48. The tether 24 may extend through a slit in the back panel 46. The tether 24 may be stitched to the back panel 46 at the slit. The airbag 22 may be generally fluidly sealed at the slit to prevent exhaust of inflation medium from the inflation chamber at the slit.

The tether 24 is connected to the impact panel 48 of the airbag 22 in any suitable fashion. As an example, the tether 24 may be stitched, ultrasonically welded, adhered, etc., to the impact panel 48. The tether 24 may be connected to the impact panel 48 in the inflation chamber, i.e., on the side of the impact panel 48 that faces the inflation chamber.

The tether 24 is connected to the deployable panel 16, 17 in any suitable fashion. As an example, the tether 24 may be fastened, adhered, ultrasonically welded, and/or stitched to the deployable panel 16, 17.

The tether 24 may be flexible relative to the deployable panel 16, 17. The tether 24, for example, may be fabric. Specifically, the tether 24 may be woven nylon yarn, for example, nylon 6-6. Other examples include polyether ether ketone (PEEK), polyetherketoneketone (PEKK), polyester, etc. The tether 24 may be of the same material type as the airbag 22.

As set forth above, in the example shown in FIGS. 1-8, the deployable panel assembly 14, 15 includes the member 50 deployable vehicle-forward of the deployable panel 16, 17, e.g., with the use of an actuator 52 such as a pyrotechnic linear actuator 54.

The member 50 is supported by the dash 12. In other words, the weight of the member 50 is directly or indirectly borne by the dash 12. The member 50 is translatable upwardly from the undeployed position to the deployed position. In translational movement, all parts of the member 50 move with the same velocity in parallel paths upwardly from the undeployed position to the deployed position.

The actuator 52 is operatively connected to the member 50 to deploy the member 50 to the deployed position. As an example, the actuator 52 may be pyrotechnically activated. As an example, the actuator 52 may be a pyrotechnic linear actuator 54 and, in such examples, the pyrotechnic linear actuator 54 has a housing 56 that houses a pyrotechnic charge and a rod 58 extendable from the housing 56 under the forces of activation of the pyrotechnic charge. The pyrotechnic linear actuator 54 includes a pyrotechnic charge. The pyrotechnic charge is activated to activate the pyrotechnic linear actuator 54.

The rod 58 is operatively connected to the member 50 to deploy the member 50 to the deployed position. Specifically, the rod 58 may be directly connected to and fixed to the member 50. In such an example, the member 50 and the rod 58 move together as a unit. In other examples, the member 50 extends into the housing 56 and is extendable from the housing 56 under the forces of activation of the pyrotechnic charge, i.e., the member 50 is the rod 58.

The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

With continued reference to FIGS. 3-9, the actuator 52, e.g., the housing 56 of the pyrotechnic linear actuator 54, may be supported by the frame 32 of the dash 12. For example, the housing 56 may be supported directly on the frame 32 and/or directly on the airbag housing which is supported by the frame 32 of the dash 12. The housing 56 may be fixed to the frame 32 and/or the airbag housing 40 in any suitable fashion, e.g., fasteners, brackets, etc.

The member 50 may extend into the housing 56 and be extendable from the housing 56 under the forces of activation of the pyrotechnic charge, i.e., the member 50 is the rod 58. The rod 58 in the deployed position is elongated upwardly to back the deployable panel 16 in the deployed position such that the deployable member 50 operates as a reaction surface for the airbag 22.

Figure 9:
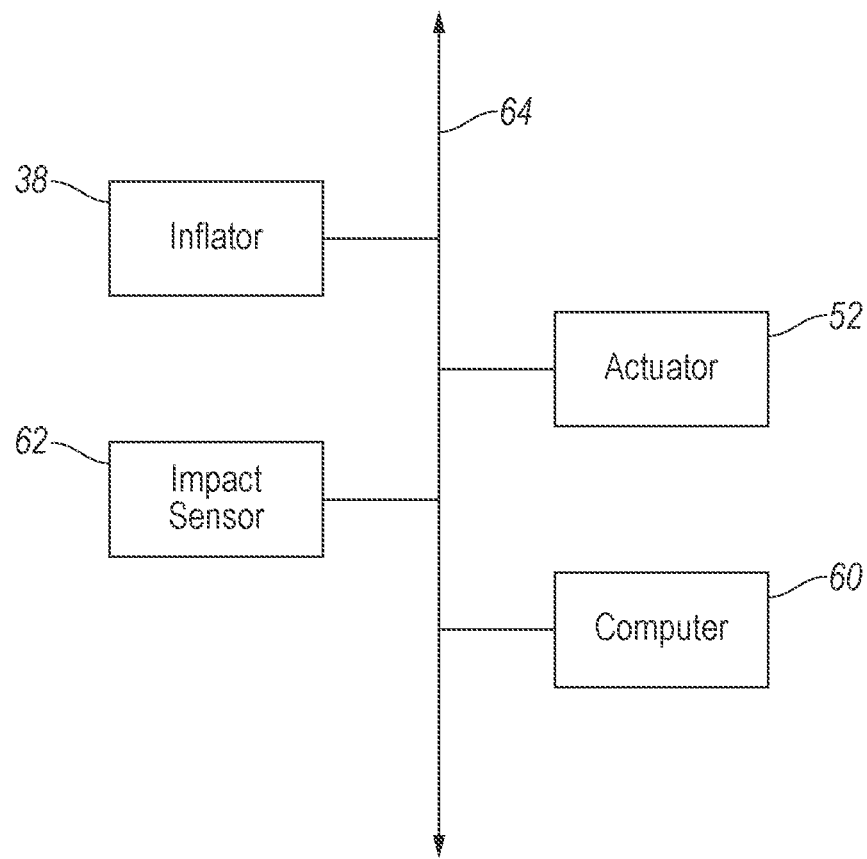
FIG. 9 is a block diagram of a system of the vehicle.
Figure 10:
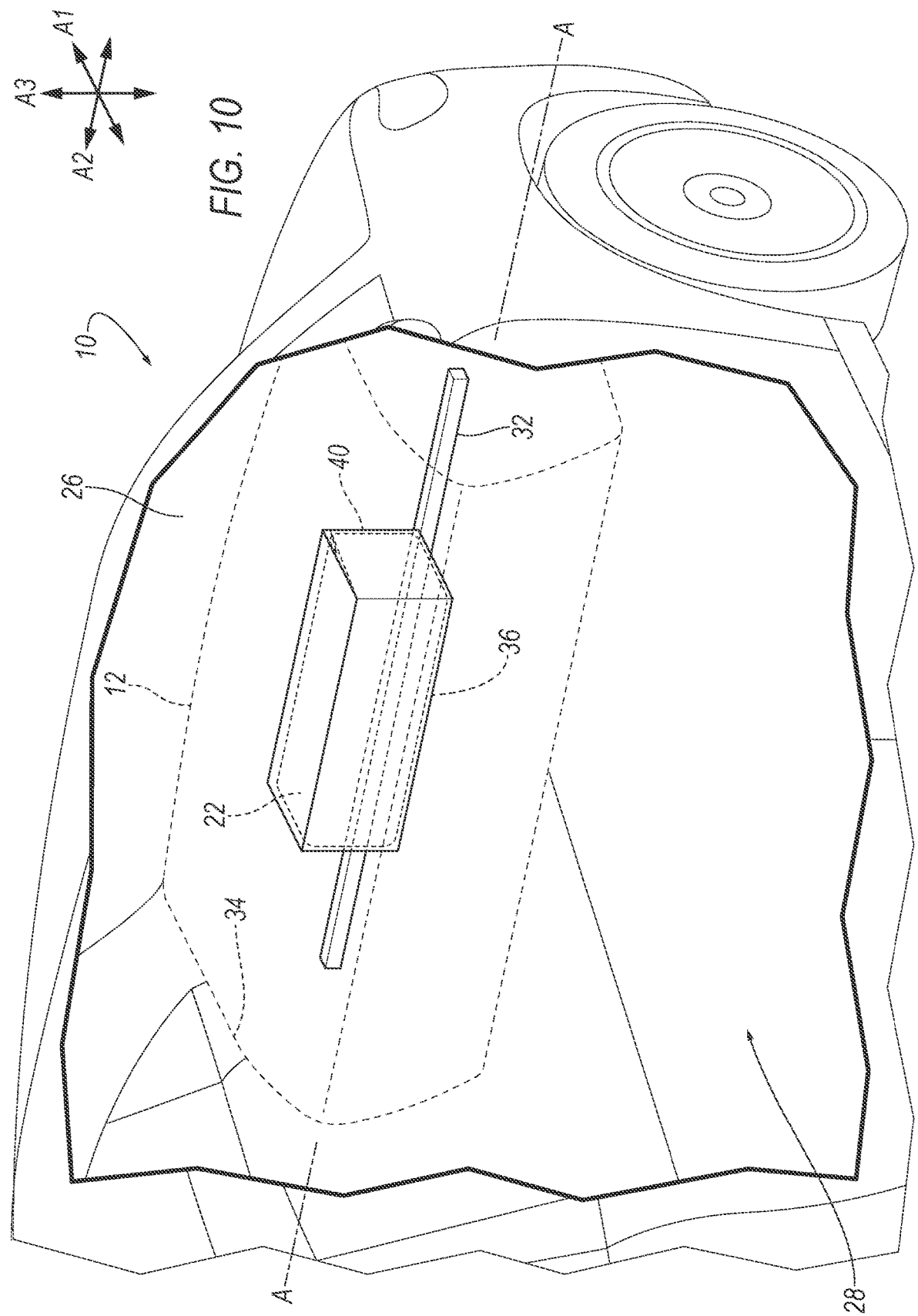
FIG. 10 is a perspective view another example of the deployable panel assembly in the undeployed position.
Figure 11:
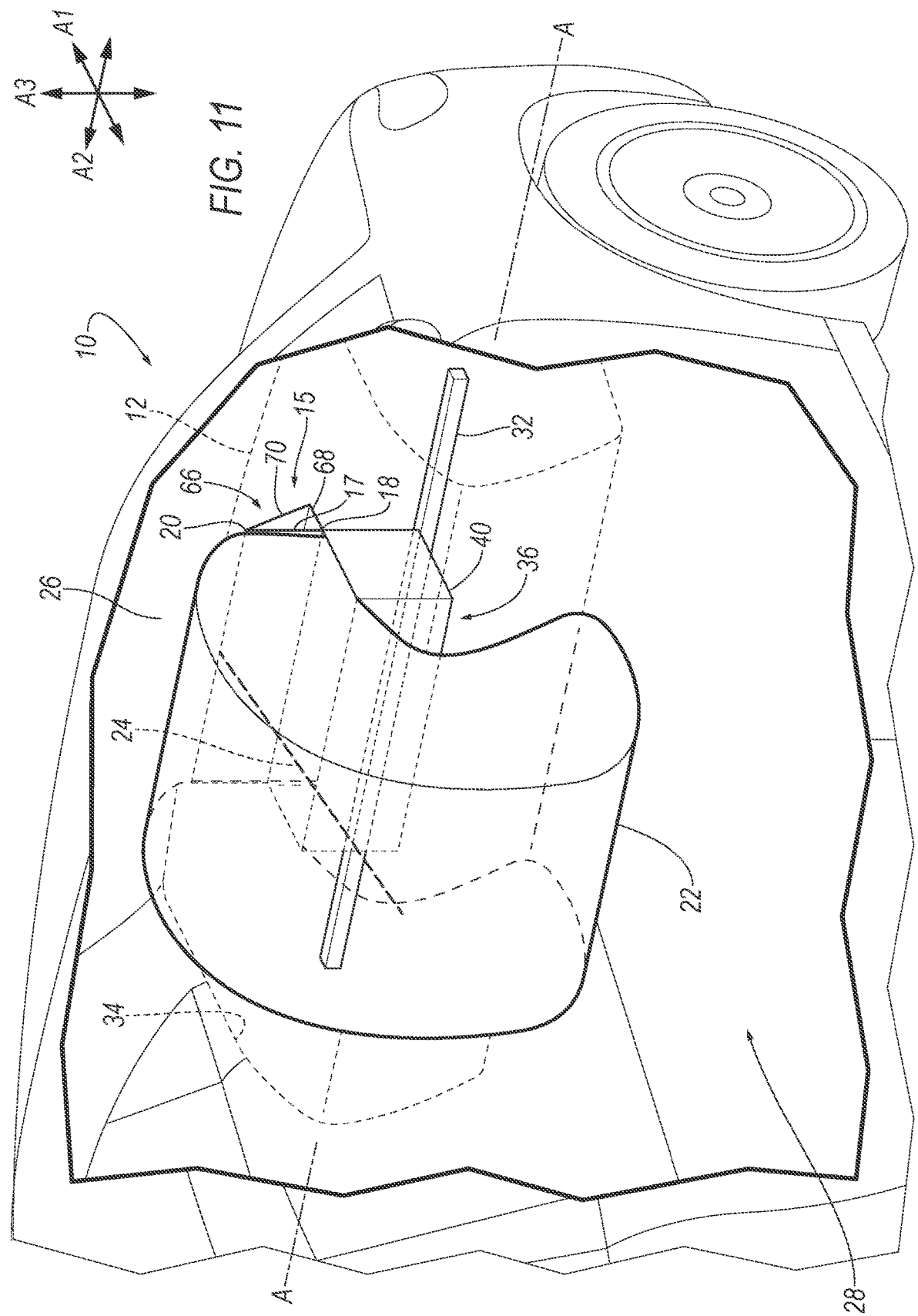
FIG. 11 is a perspective view of the example of FIG. 9 with the deployable panel assembly in the deployed position.
Figure 12:
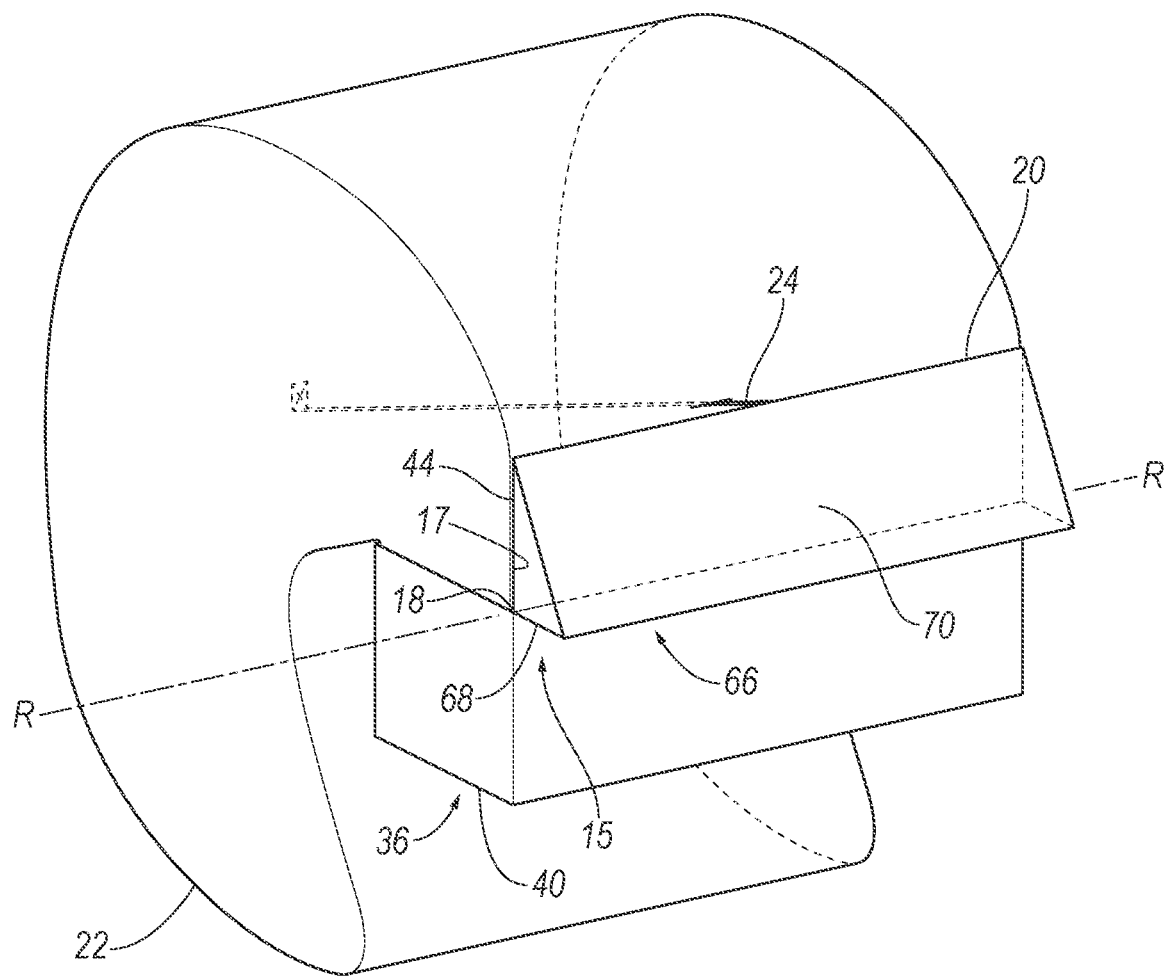
FIG. 12 is a perspective view of the deployable panel assembly of FIG. 9.
Figure 13:
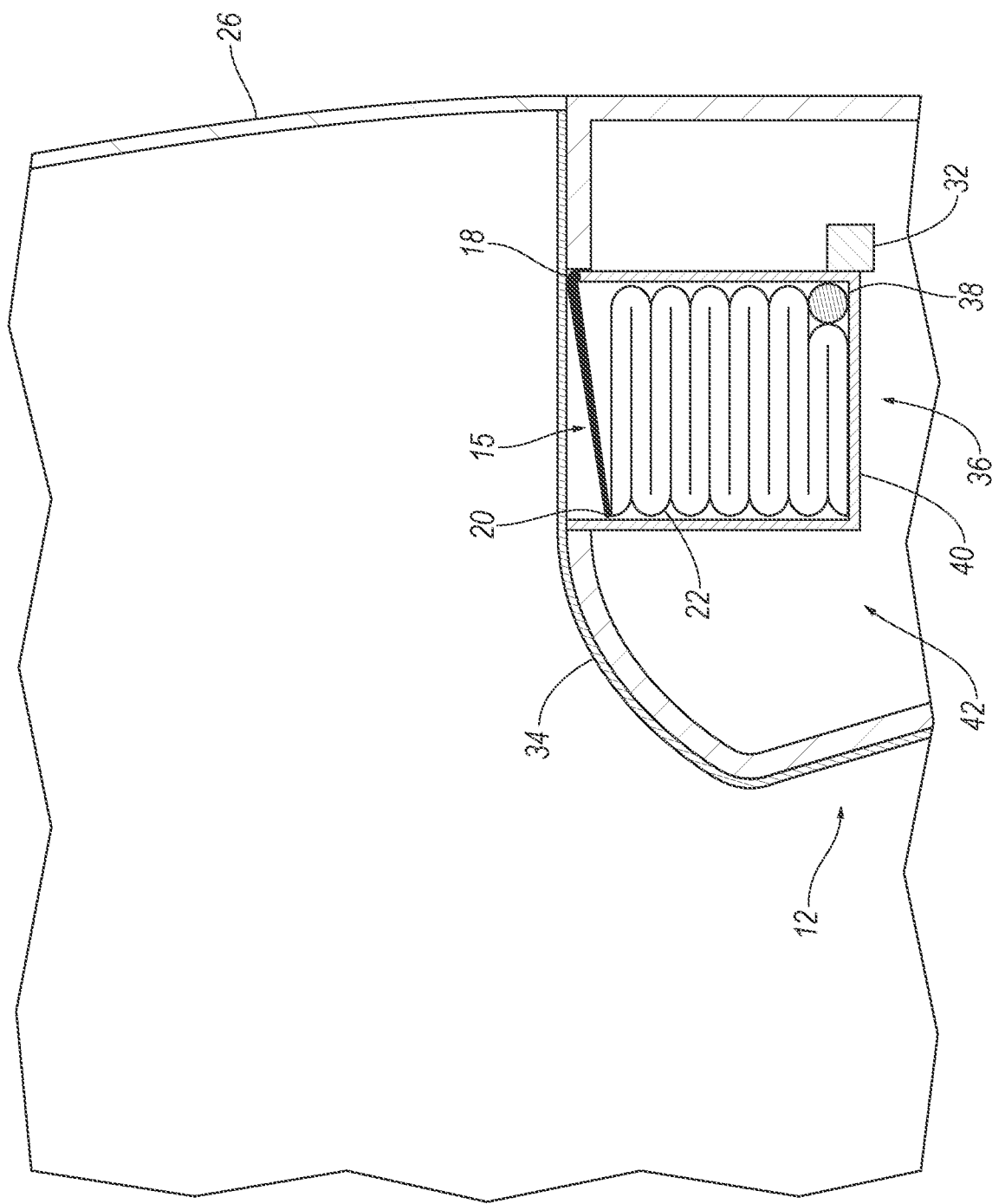
FIG. 13 is a cross-sectional view of a dash and the deployable panel assembly of FIG. 9 in the undeployed position.
Figure 14:
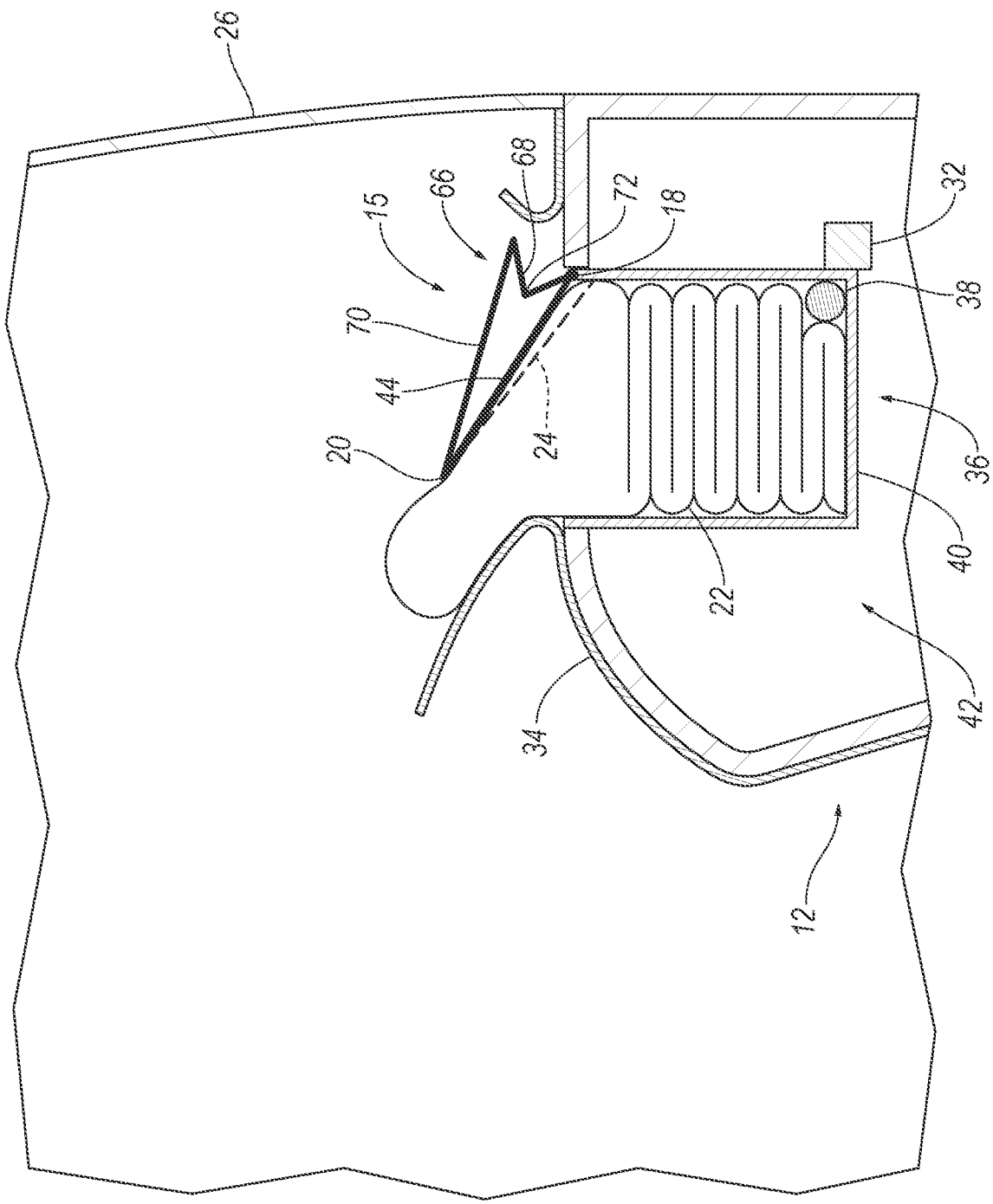
FIG. 14 is the cross-sectional view of FIG. 12 with an airbag partially inflated.
Figure 15:
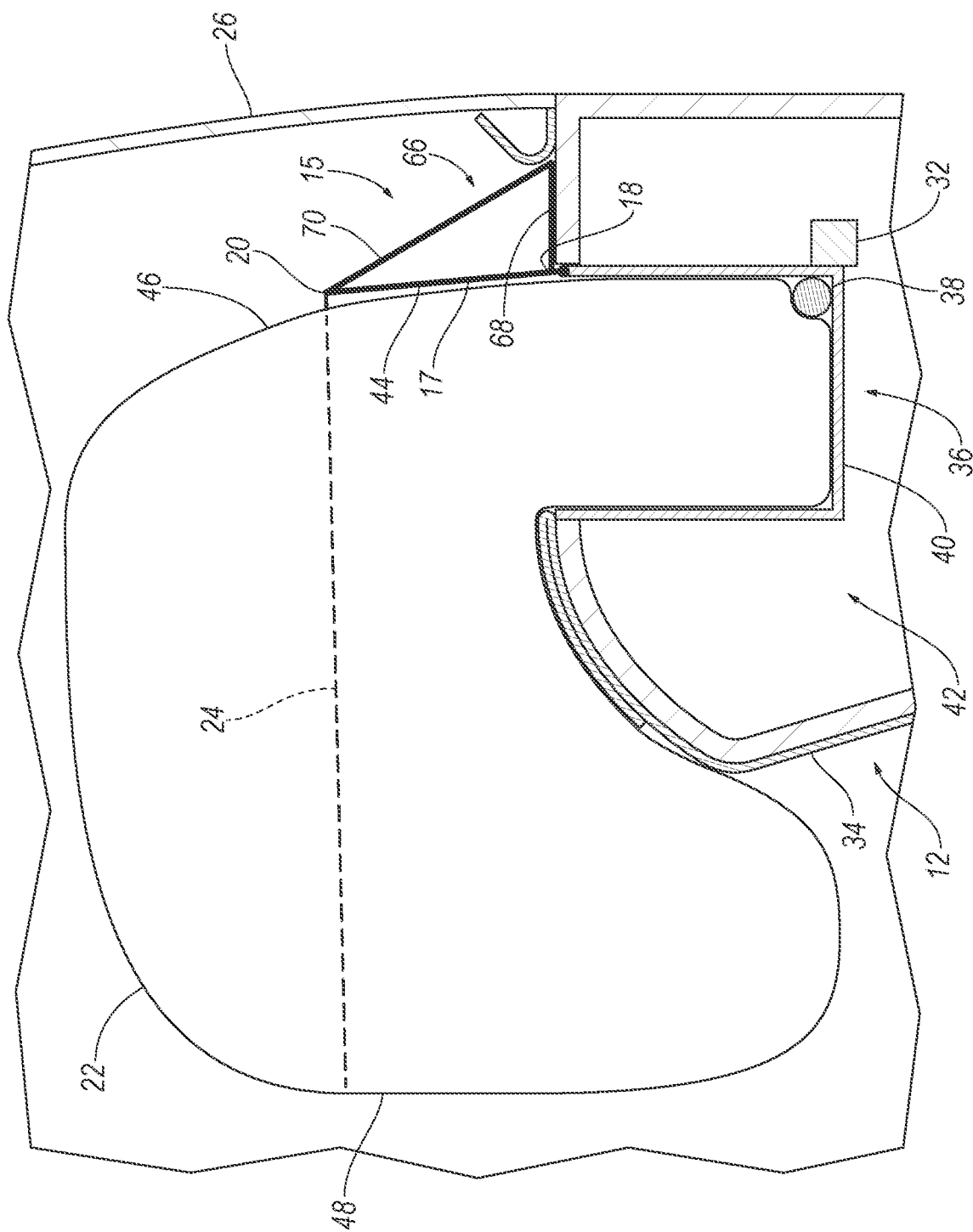
FIG. 15 is the cross-sectional view of FIG. 13 with the airbag in an inflated position.

With reference to FIG. 9, the vehicle 10 may include a computer 60 having a processor and a memory storing instructions executable by the processor to deploy the airbag 22 and the actuator 52. The computer 60 may be, for example, a restraints control module. Use of "in response to," "based on," and "upon determining" herein indicates a causal relationship, not merely a temporal relationship.

The vehicle 10 may include at least one impact sensor 62 for sensing certain impacts of the vehicle. The impact sensor 62 is in communication with the computer 60. The computer may activate the inflator 38, e.g., provide an impulse to a pyrotechnic charge of the inflator 38 when the impact sensor 62 senses certain impacts of the vehicle 10. Alternatively or additionally to sensing certain impacts, the impact sensor 62 may be configured to sense impact prior to impact, i.e., pre-impact sensing. The impact sensor 62 is configured to detect certain impacts to the vehicle. The impact sensor 62 may be of any suitable type, for example, post-contact sensors such as accelerometers, pressure sensors, and contact switches; and pre-impact sensor 62s such as radar, LIDAR, and vision-sensing systems. The vision-sensing systems may include one or more cameras, CCD image sensors, CMOS image sensors, etc. The impact sensor 62 may be located at numerous points in or on the vehicle.

The computer 60 may activate the actuator 52. In examples in which the actuator 52 is pyrotechnic linear actuator 54, the computer 60 may provide an impulse the pyrotechnic charge of the pyrotechnic linear actuator 54 when the impact sensor 62 senses certain impacts of the vehicle 10 to move the member 50 from the undeployed position to the deployed position. The computer 60 may activate the actuator 52 before or simultaneously with the activation of the airbag 22.

The computer 60 in the Figures illustrates an example storage medium. Storage medium may be any non-transitory computer-readable storage medium or machine-readable storage medium, such as an optical, magnetic or semiconductor storage medium. In various implementations, storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit) ASIC, (an electronic circuit, a processor)shared, dedicated, or group), and/or memory)shared, dedicated, or group (that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

The vehicle 10 includes a communication network 64 that can include a bus in the vehicle 10 such as a controller area network (CAN) or the like, and/or other wired and/or wireless mechanisms. Via the communication network 64, the computer 60 may transmit messages to various devices in the vehicle 10 and/or receive messages (e.g., CAN messages) from the various devices, e.g., sensors, an actuator, an human machine interface (HMI), etc. Alternatively or additionally, in cases where the computer 60 actually comprises a plurality of devices, the communication network 64 may be used for communications between devices represented as the computer 60 in this disclosure. Further, as mentioned below, various controllers and/or sensors may provide data to the computer 60 via the communication network 60.

In the example shown in FIGS. 3-9, the deployable panel 16 is folded in the undeployed position and unfolds as the airbag 22 rotates the deployable panel 16 from the undeployed position to the deployed position. The fold of the deployable panel 16 in the undeployed position and unfolding to the deployed position allows for minimized packaging of the deployable panel 16 in the undeployed position and maximized extension of the deployable panel 16 from the dash 12 in the deployed position.

Specifically, with reference to FIGS. 5-8, the deployable panel 16 has a proximal segment 74 having the proximal end 18 and a distal segment 76 having the distal end 20. The distal segment 76 is folded against the proximal segment 74 in the undeployed position. For example, the deployable panel 16, 17 may include a living hinge between the distal segment 76 and the proximal segment 74. The distal segment 76 and the proximal segment 74 are generally in parallel planes and abut each other in the undeployed position.

The distal segment 76 is designed to unfold 72 from the proximal segment 74 from the undeployed position to the deployed position. As an example, the distal segment 76 may be positioned to be engaged by the airbag 22 and rotated away from the proximal segment 74 by the airbag 22 during inflation of the airbag 22. As another example, the fold 72 between the proximal segment 74 and the distal segment 76 may have resilient memory that biases the distal end 20 away from the proximal end 18.

In the example shown in FIGS. 10-15, the deployable leg 66 extends from the deployable panel 16, 17 in the deployed position and abuts the dash 12 in the deployed position. Specifically, the deployable leg 66 abuts an upper surface of the dash 12, e.g., an upper surface of the covering 34. When the deployable leg 66 abuts the dash 12 in the deployed position, the deployable leg 66 stops rotation of the deployable panel 17 relative to the dash 12 such that the deployable panel 17 operates as the reaction surface 44 for the airbag 22. The deployable leg 66 is rigid relative to the deployable panel 17 to maintain the position of the deployable panel 17 relative to the dash 12 against the forces of the airbag 22 during inflation of the airbag 22 toward the inflated position and while the airbag 22 is in the inflated position, including while the airbag 22 controls the kinematics of the occupant during certain vehicle impacts. For example, the deployable leg 66 is sized, shaped, and of material type to be rigid relative to the deployable panel 17.

The deployable leg 66 and the deployable panel 17, when in the deployed position, may have a triangular shape. Specifically, the deployable panel 17 is one leg of the triangular shape and the deployable leg 66 is the other two legs of the triangular shape. The deployable leg 66 may include a lower segment 68 extending from the proximal end 18 of the deployable panel 17 along the dash 12 in the deployed position and an upper segment 70 extending from the distal end 20 of the deployable panel 17 downwardly to the lower segment 68 in the deployed position. In such an example, the lower segment 68 is connected to the proximal end 18 of the deployable panel 17 and the upper segment 70 in both the undeployed position and the deployed position, and the upper segment 70 is connected to the distal end 20 of the deployable panel 17 and the lower segment 68 in both the undeployed position and the deployed position. The deployable panel 17, the upper segment 70, and the lower segment 68 are connected to each other in any suitable fashion, e.g., living hinges.

The lower segment 68 may include a fold 72 when the deployable panel 17 is in the undeployed position. The fold 72 unfolds as the airbag 22 rotates the deployable panel 17 from the undeployed position to the deployed position. The fold 72 of the lower segment 68 in the undeployed position and unfolding to the deployed position allows for minimized packaging of the deployable leg 66 in the undeployed position and maximized extension of the deployable leg 66 from the deployable panel 17 in the deployed position. As an example, the fold 72 may include a living hinge. The fold 72 is designed to unfold 72 as the deployable panel 17 rotates from the undeployed position to the deployed position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a dash;
   a deployable panel having a proximal end rotatably connected to the dash, the deployable panel being rotatable about the proximal end from an undeployed position to a deployed position, the proximal end being engaged with the dash in the deployed position and the deployable panel having a distal end spaced above the dash in the deployed position;
   an airbag supported by the dash and inflatable to an inflated position, the airbag having a back panel abutting the deployable panel in the inflated position and an impact panel opposite the back panel; and
   a tether connected to the deployable panel and the impact panel and extending through the back panel from the deployable panel to the impact panel.

2. The assembly as set forth in claim 1, wherein the airbag defines an inflation chamber defined between the back panel and the impact panel, the tether extending through the inflation chamber from the back panel to the impact panel.

3. The assembly as set forth in claim 1, wherein the tether is flexible relative to the deployable panel.

4. The assembly as set forth in claim 1, wherein the tether is fabric.

5. The assembly as set forth in claim 1, wherein the deployable panel in the deployed position is rigid relative to the airbag in the inflated position.

6. The assembly of claim 1, wherein the proximal end of the deployable panel is rotatable about a rotational axis and the deployable panel is elongated along the rotational axis.

7. The assembly as set forth in claim 1, wherein the dash is elongated along a longitudinal axis and the proximal end of the deployable panel is rotatable about a rotational axis generally parallel with the longitudinal axis.

8. The assembly as set forth in claim 1, further comprising an airbag housing connected to the dash, the deployable panel being rotatably connected to the housing below a covering of the dash in the undeployed position.

9. The assembly as set forth in claim 8, wherein the covering of the dash includes a tear seam.

10. The assembly as set forth in claim 1, further comprising a windshield, the deployable panel being between the airbag and the windshield.

11. The assembly as set forth in claim 1, wherein the deployable panel has a proximal segment having the proximal end and a distal segment having the distal end, the distal segment being folded against the proximal segment in the undeployed position.

12. The assembly as set forth in claim 11, wherein the distal segment is designed to unfold from the proximal end from the undeployed position to the deployed position.

13. The assembly as set forth in claim 1, further comprising a member supported by the dash and translatable upwardly from an undeployed position to a deployed position, the deployable panel abutting the member in the deployed position, the member being rigid relative to the deployable panel in the deployed position.

14. The assembly as set forth in claim 1, further comprising a deployable leg extending from the deployable panel in the deployed position and abutting the dash.

15. The assembly as set forth in claim 14, wherein the deployable panel is between the airbag and the leg.

16. The assembly as set forth in claim 14, wherein the deployable leg includes a lower segment extending from the proximal end of the deployable panel along the dash and an upper segment extending from the distal end of the deployable panel downwardly to the lower segment.

17. The assembly as set forth in claim 16, wherein the deployable panel is between the airbag and the deployable leg.

18. The assembly as set forth in claim 16, wherein the lower segment includes a fold when the deployable panel is in the undeployed position.

* * * * *